United States Patent [19]

Pritchard

[11] Patent Number: 5,384,436
[45] Date of Patent: Jan. 24, 1995

[54] APPARATUS AND METHOD FOR ELECTRICALLY WEIGHING BALES IN A MOBILE CROP BALER

[76] Inventor: Gary E. Pritchard, 6007 N. 62nd Dr., Glendale, Ariz. 85301

[21] Appl. No.: 84,878

[22] Filed: Jun. 30, 1993

[51] Int. Cl.⁶ ...................... G01G 19/08; B30B 15/00
[52] U.S. Cl. .................... 177/136; 177/145; 177/199; 100/99
[58] Field of Search .................. 177/136, 145, 199

[56] References Cited

U.S. PATENT DOCUMENTS

| | | | |
|---|---|---|---|
| 2,982,201 | 5/1961 | Kruger et al. | 100/99 |
| 3,363,707 | 1/1968 | Murray et al. | 177/136 |
| 3,426,672 | 2/1969 | Nolt . | |
| 3,567,072 | 3/1971 | Tenhulzen | 177/145 X |
| 4,393,951 | 7/1983 | Horst-Rudolf | 177/136 |
| 4,491,190 | 1/1985 | Mayfield | 177/139 |
| 4,742,880 | 5/1988 | Schrag et al. | 177/136 |
| 4,961,375 | 10/1990 | Weder et al. . | |

OTHER PUBLICATIONS

"New Holland 515", Ford, 1992, U.S.A.
"Rectangular Balers", John Deere, Date Unknown, U.S.A.
"Square Balers", John Deere, Date Unknown, U.S.A.
"Rectangular Baler 8540", CASE-IH, Date Unknown, U.S.A.
"Freeman 370", Freeman, Date Unknown, U.S.A.
"New Holland 505", Ford, Date Unknown, U.S.A.
"New Holland 565, 570, 575", Ford, 1991, U.S.A.
"New Holland 2000", Ford, 1989, U.S.A.
"Bale Chute & Weight Indicator", Freeman, Date Unknown, U.S.A.

Primary Examiner—George H. Miller, Jr.
Attorney, Agent, or Firm—Donald J. Lisa; Steven Lin

[57] ABSTRACT

A mobile apparatus and method for weighing bales on an electronic scale in a field. Fixedly supported on the rear end of a mobile crop baler are two load cells from which is pivotably suspended the inboard end of a bale-receiving-structure. The outboard end of the bale-receiving-structure is adjustably supported by a tether from at least one other load cell fixed to a rearwardly extended portion of the baler which allows the outboard end to swing upwardly as the underside of the bale-receiving-structure encounters berms in the field thereby preventing damage to the electronic scale components. The weight of each bale produced by the baler is digitally readout in the baler cabin where, by comparison to a predetermined weight, real time adjustments are automatically or manually made to adjust bale weight to the predetermined weight, thereby achieving greater weighing accuracy and enhanced overall output from the field. The scale may be used on original equipment balers or made to retrofit existing balers.

26 Claims, 5 Drawing Sheets

APPARATUS AND METHOD FOR ELECTRICALLY WEIGHING BALES IN A MOBILE CROP BALER

BACKGROUND OF THE INVENTION

1. Fields of the Invention

The present invention relates generally to weighing crop bales on an electronic scale in a mobile crop baler, and more particularly, to an electronic scale in which the bale-receiving-structure is pivotably connected to load cells fixed to the baler to prevent damage to the scale during use. The scale weighs bales more accurately and can be retrofitted to existing balers.

2. Discussion of Background and Prior Art

Apparatus and methods for mechanically or electrically weighing crop bales are well known.

A standard bale chute and weight indicator is a mechanical scale for weighing bales and displaying the bale weight on a mechanical indicator. It is designed for use with a standard mobile baler such as the Freeman 370. In such a combination, the Freeman 370 discharges the bale from the rear of the baler onto a platform pivotably connected to the baler. The weight of the bale pulls down on a resilient bale chute spring-chain which rotates a lever around a shock absorber pivot to indicate a bale weight. After the bale is weighed, a pyramidal bale turner "kicks" the bale to a discharge position in the bale chute by imparting a counterclockwise quarter turn, standing the bale upright in the field as the bale is discharged from the platform. The problem with these typical methods and apparatuses for weighing bales is that they are crude and unable to consistently weigh bales accurately.

Kruger U.S. Pat. No. 2,982,201 ("Kruger") disclosed another apparatus for mechanically weighing bales, like the one used with a Freeman 370, and also using a mechanical weight indicator. Kruger's bale chute platform is hinged directly to the baler, as in the Freeman 370. Kruger requires the operator to manually adjust the bale pressure density so that the actual bale weight is maintained at a desired level.

Schrag, et al. U.S. Pat. No. 4,742,880 ("Schrag") disclosed a method for electrically weighing and displaying the weight of the bales on a platform which is a separate accumulating cart coupled to the baler and wherein the bale pressure density is manually adjusted to maintain actual bale weight at a desired level. In this structure the load cells are fixedly connected to the cart's platform. The problem with this method is the investment in an expensive cart in addition to the baler in order to weight the bales produced by the baler and the absence of an automatic feedback controller. The Ford New Holland 2000 baler is like Schrag with the additional feature of reading out and automatically adjusting bale pressure density to automatically maintain bale density at a predetermined level.

One of the inherent problems of weighing bales by maintaining predetermined density is that the internal density of the bale is highly variable and non-uniform throughout the bale. Therefore, depending on where the bale sits on the platform and where its center of gravity is located, the scale reading of the bale weight is highly variable and inaccurate. Typically, prior art scales weigh bales only within a 20 pound accuracy.

In overcoming the problems and limitations of the prior art, it is an object of the present invention to weigh bales in an electronic scale directly attached to the bale chute the platform of which pivots to prevent damage to the scale (i.e. baler going over berms in the field).

It is another object of the present invention to provide an electronic scale that weighs bales to within a 2 pound accuracy when the baler is moving and to within a 1 pound accuracy when the baler is stationary.

It is a further object of the present invention to provide a scale that has the capability of being retrofitted to presently existing balers.

SUMMARY OF THE INVENTION

Set forth below is a brief summary of the invention in order to solve the foregoing problems and achieve the foregoing and other objects, benefits, and advantages in accordance with the purposes of the present invention as embodied and broadly described herein.

One aspect of the invention is in a mobile crop baler which produces crop bales at a rear end of the baler as it advances across a crop field and which has a system for weighing the bales which includes a bale-receiving-structure coupled to the baler for receiving the bales discharged from the baler and a controller for reading out and adjusting a bale-weight-indicative signal. The improvement in this system includes a pair of load cells fixedly mounted in spaced relation to each other to the rear end and transversely the longitudinal axis of the baler, a bale-receiving-structure having first and second ends, the first end pivotably connected to the pair of load cells, a first rigid, longitudinal support member extending rearwardly from the rear end of the baler to which is fixedly mounted a third load cell, the second end of the bale-receiving-structure being supported by a tether attached to the third load cell, each load cell having an output for transmitting a bale-weight-indicative output signal, and the outputs of the load cells coupled to the readout means.

A further feature of the invention is in deflecting the outboard end of the bale chute upwardly about its hinged connection to the load cells when traversing berms in the field to prevent damage to the load cells.

A further aspect of the invention is the direct electrical readout of the weight of the bales in-cabin with manual or automatic bale density adjustment to zero out any difference signal between actual and preselected bale weight to maintain a preselected bale weight. The invention includes the ability to quickly disconnect the scale and platform for road travel.

DETAILED DESCRIPTION OF THE INVENTION

Figures 1, 1A:
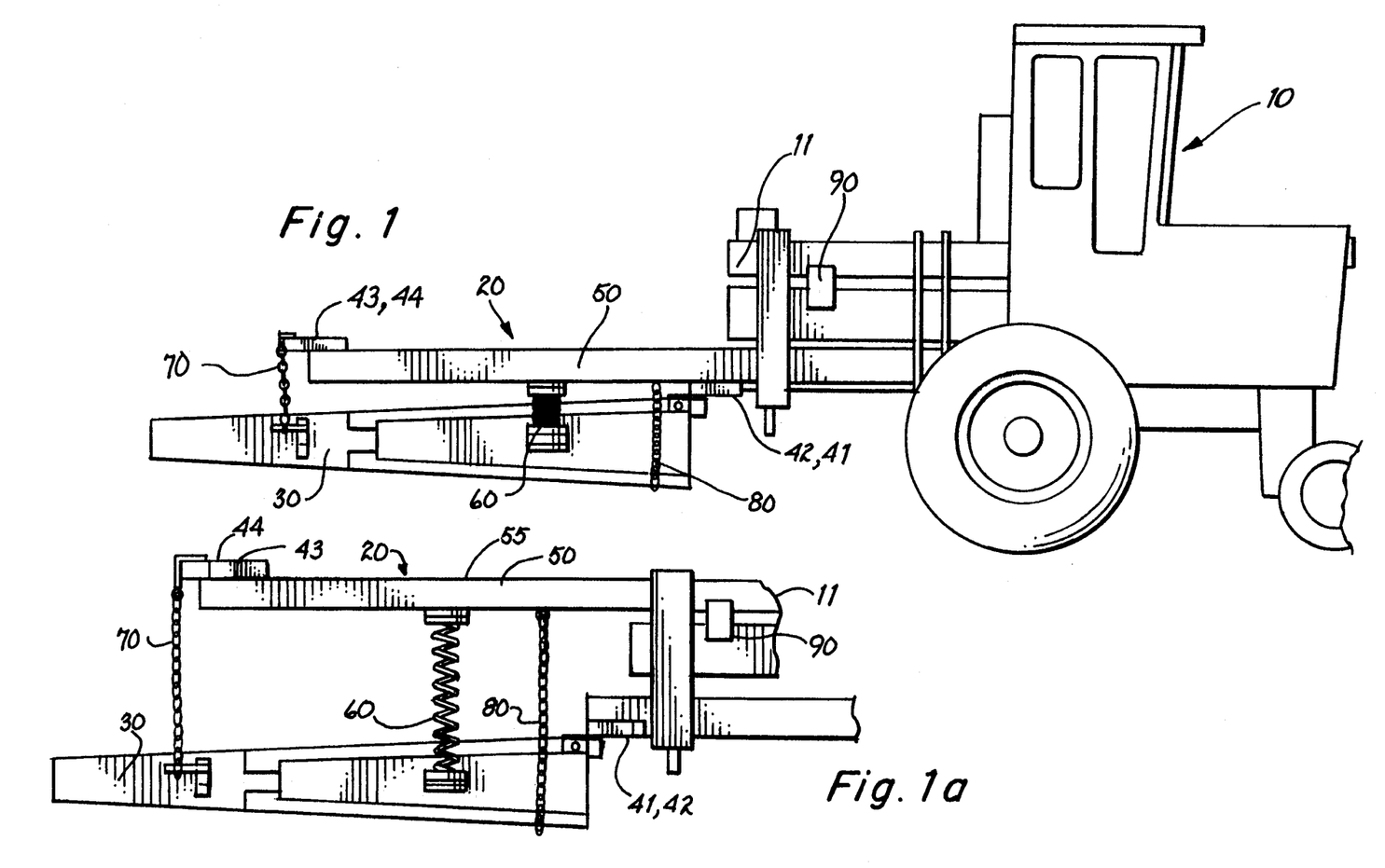
FIG. 1—Side view of a first embodiment of an electronic scale for weighing bales directly attached to a baler.
FIG. 1a—Side view of a second embodiment of an electronic scale for weighing bales directly attached to a baler.

FIGS. 1 and 1a show side views of first and second embodiments of a mobile crop baler 10 which includes a bale-receiving-structure 20 for weighing crop bales 5. These two embodiments are now described in more detail.

The First Embodiment

Figure 2:
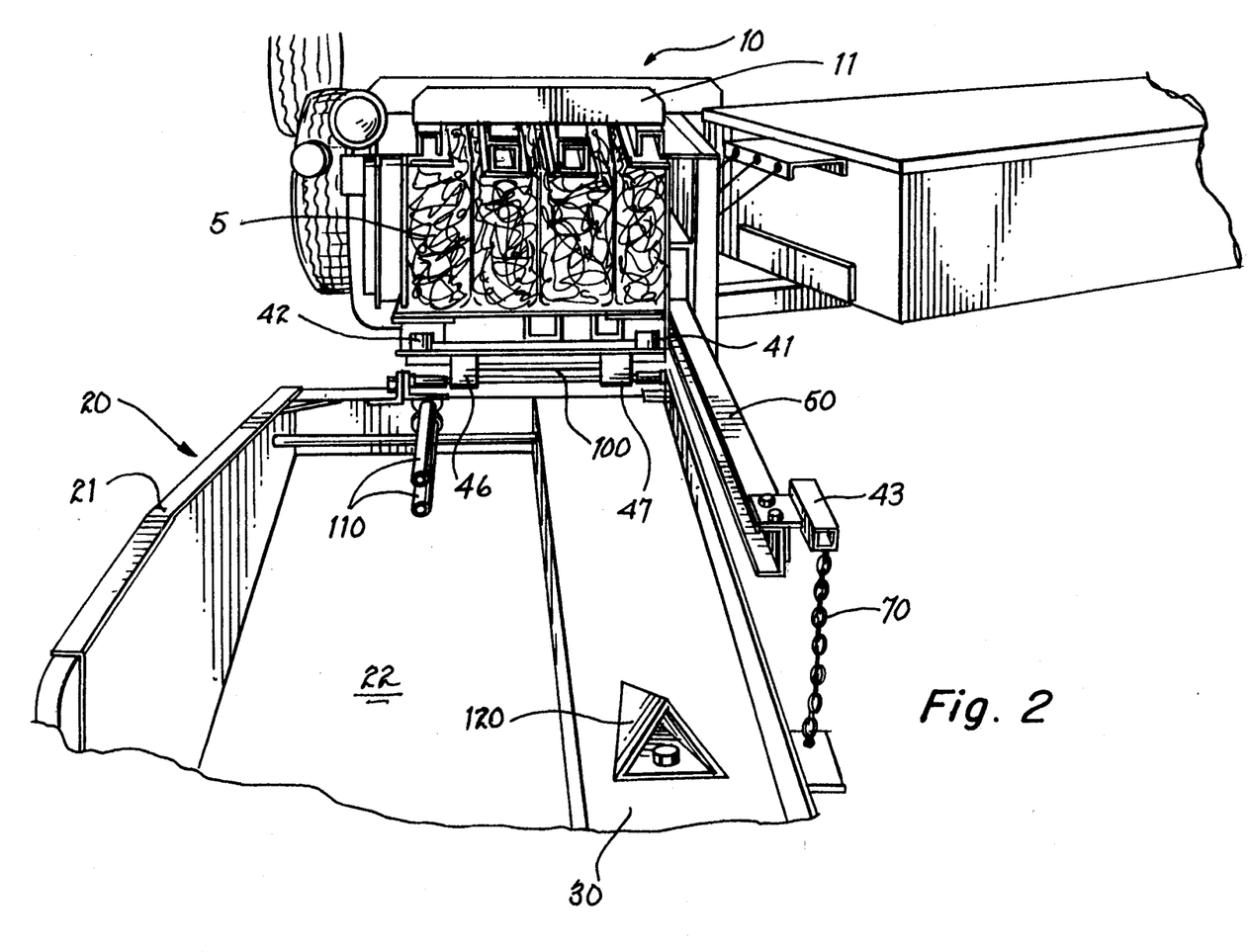
FIG. 2—Rear view of the first embodiment of the electronic scale for weighing bales directly attached to a baler.
Figure 3:
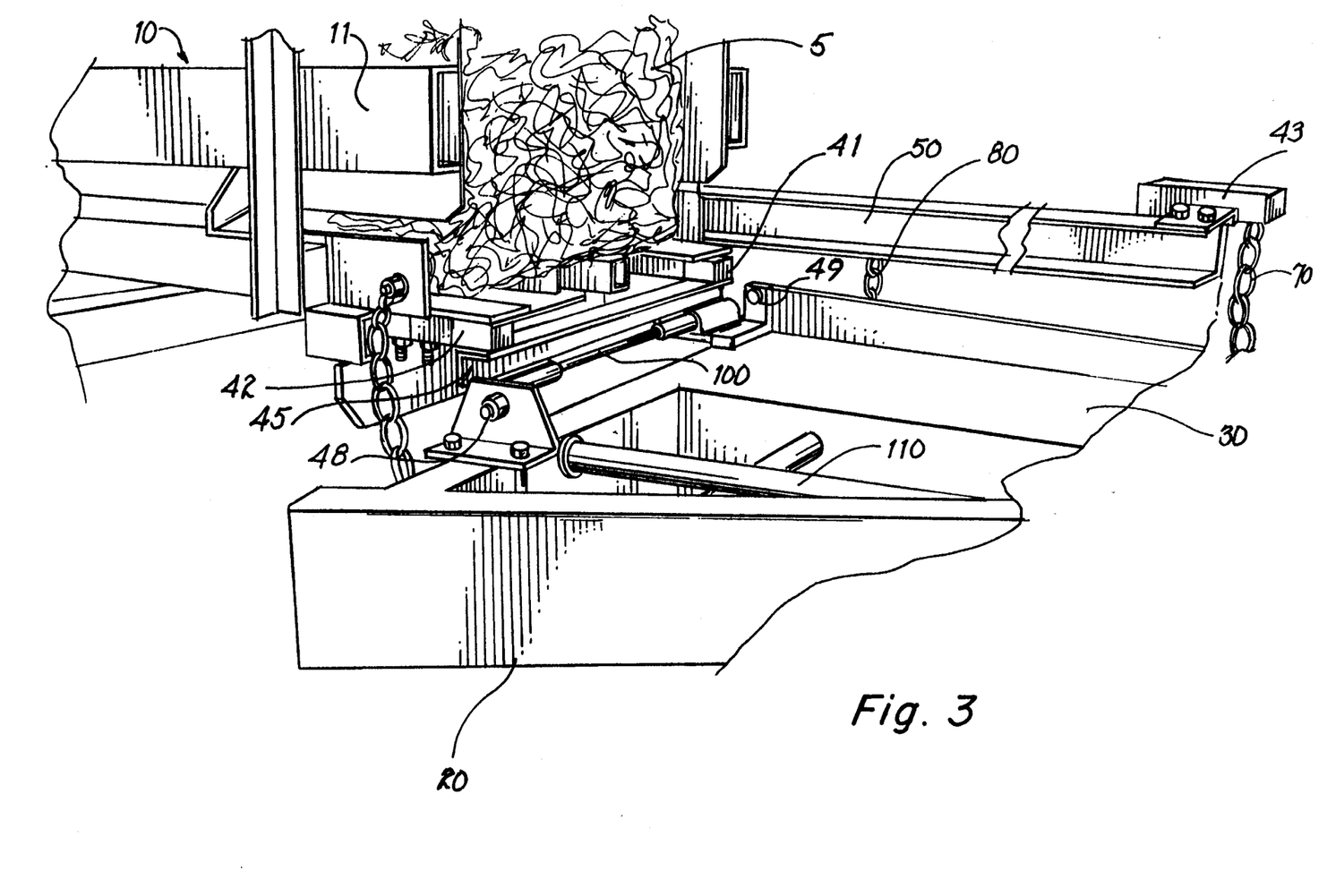
FIG. 3—Perspective view of the first embodiment of the electronic scale for weighing bales directly attached to a baler.

As seen in FIGS. 1 to 3, the first embodiment of the electronic scale for weighing bales includes a mobile crop baler 10 which traverses a field of crops to be baled, such as hay, and produces crop bales 5 at the rear end 11 of the baler. The bales are successively pushed onto a bale chute platform 30 attached to the rear end 11 of the baler. A first pair of load cells 41, 42 are mounted on the rear end of the baler in spaced relation to each other, one on each side of the rear end 11 of the baler, transversely to the longitudinal axis of the baler 10. As best seen in FIG. 3., the bale chute platform 30 is attached to the pair of load cells 41, 42 by a pivotable connection which includes a unitary transverse member 45 having depending supports 46, 47 to which is rotatably mounted bar 100 secured by bolted angle iron supports 48, 49 to and supporting bale chute platform 30 at its inboard end nearest the baler 10. Other types pivotable connections may be used, may be used to connect the bale chute platform to the load cells. For example, heavy eyelets may be welded to the underside of the load cell casings and the mounting bar 100 may be rotatably supported in the eyelets and secured at its outer ends to bale chute platform 30 by the bolted angle iron supports 48, 49.

The outboard end of the bale chute platform 30 is supported by a tether 70 secured to load cell 43 affixed to beam 50 which extends rearwardly from the rear end 11 of baler 10. The tether 70 is a chain or similar lanyard which is of adjustable length to vary the angle of the bale chute platform 30, and, therefore, the rate at which the bales are weighed. Also, tether 70 acts as a constraint to the travel of the outboard end of the bale chute platform 30 about its pivotable connection to the baler. When, as frequently happens in the field, the underside of the bale chute platform contacts a berm and forces the bale chute platform upwardly relative to the longitudinal axis of the baler 10, the platform 30, by virtue of its pivotable connection 100, 46, 47 to load cells 41, 42 and its tethered connection 70 to load cell 43, is enabled to first swing its outboard end up against the pressure of shock absorber 60 until the berm is traversed and then swing its outboard end back to its lowered position restrained and supported by the limited length of tether 70. Thus, damage to the load cells 41, 42, 43, which would otherwise have occurred through a rigid non-pivotable connection, is prevented.

Optional bale support pipes 110 mounted to the bale-receiving-structure 20 help to hold the bale on the bale chute platform 30 while it is being weighed. The next bale, and gravity by virtue of the vertical angel of the platform 30 set by tether 70, push the weighed bale rearwardly until it hits optional pyramid 120 mounted to platform 30 which kicks the bale 5 one quarter turn counterclockwise causing it to fall into the space 22 between the bale chute platform 30 and the bale chute member 21 and to stand upright in the crop row being baled in the field for subsequent pick up. Support pipes 110, or a similar member, may be needed especially in retrofitting existing Dale chute platforms to include the present invention.

Figure 4:
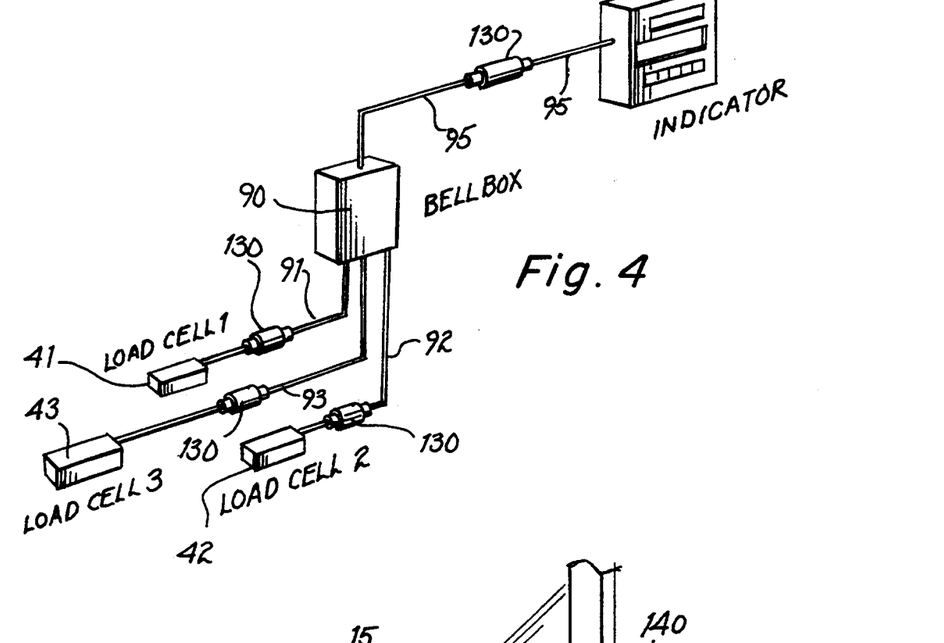
FIG. 4—Diagram of the electrical connections and quick disconnectors between the load cells, bell box and the digital indicator.

The weight of bale 5 causes a downward displacement of platform 30 which stresses the load cells 41, 42, and 43 that are connected to platform 30. The amount of stress that is applied to each load cell causes a proportional amount of deflection to occur within the load cell. Each load cell then produces an output voltage ("load cell output voltage") corresponding to the proportional amount of deflection that occurs. Referring to FIG. 4, load cell wires 91, 92, and 93 are each connected to the outputs of load cells 41, 42, and 43 respectively through quick disconnects 130, and the load cell wires are then connected to a bell box 90 so that each of the load cell output voltages are transmitted to a central location.

Load cell wires 91, 92, and 93 are connected together in parallel to a common junction in the bell box 90. Commoning the load cell outputs in parallel produces a voltage value that reflects the average amount of deflection that occurred in all of the load cells ("average load cell voltage") from the weight of a bale 5. The average load cell voltage is transmitted to the digital indicator 140 via bell box wire 95 connected from the output of the bell box 90 to the digital indicator 140.

The digital indicator receives and samples a number of average load cell voltages for a given bale 5 over a predetermined time period. The average value of the number of voltages sampled over the time period is then computed, and this average value is defined as the weight voltage. The digital indicator 140 then correlates the weight voltage to a corresponding actual bale weight, and the actual weight of the bale is displayed by the indicator 140.

As shown in FIG. 4, the connectors 130 may be inserted between the load cells and the bell box wire 95 and between the bell box and the digital indicator 140 so that the load cells and digital indicator 140 can be quickly and conveniently disconnected and reconnected to allow the operator to remove the bale chute platform and electronic scale components for re-rigging another mobile baler 10 or for hilly road travel.

Referring to FIG. 1, the electronic scale 20 has other features that allow it to more accurately weigh bales. One such feature is a shock absorbing spring 60 or similar structure, such as a shock absorber, mounted between the beam 50 and platform 30 to absorb shock and dampen vibrations and oscillations of the bale-receiving-structure 20. Another such feature is the use of chains 80 as shown in FIGS. 1 and 3 which support the platform 30 to the baler 10 during rigging and de-rigging or in the event of a failure.

Figure 5:
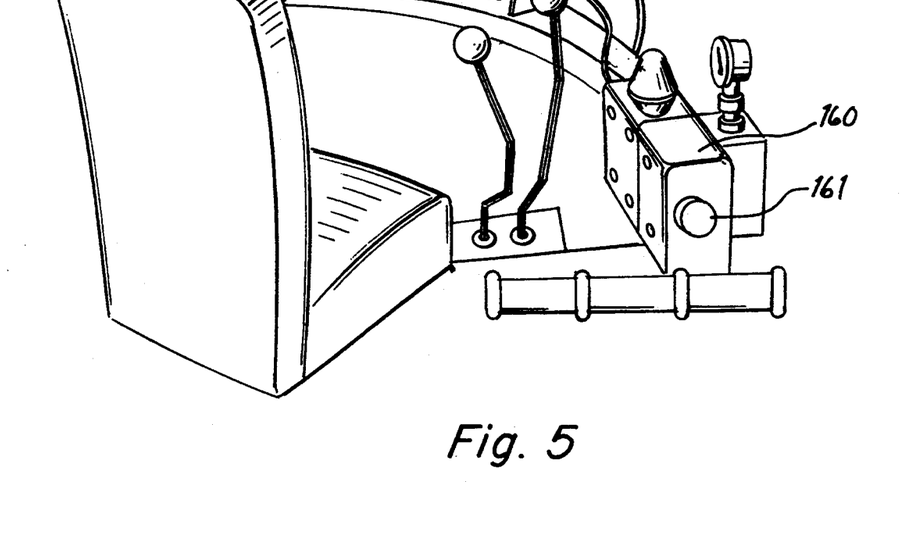
FIG. 5—Rear inside view of the cab of the baler showing the digital indicator, the manual bale pressure adjuster, and the automatic controller of the bale pressure adjuster.

Referring now to FIG. 5, the digital indicator 140 is shown mounted in the cab of the baler 10. The bell box output wire 95 connects to the digital indicator 140. The digital indicator 140 allows the operator to monitor the actual weights of the bales. As in well known in the art, the operator may then manually change the bale pressure adjuster 160 by rotating knob 161 to increase or decrease the bale pressure so that the actual weight of the bale is adjusted to a predetermined bale weight.

Alternatively, the bale density and weight can be controlled by an automatic feedback controller 150 which automatically monitors and maintains the actual weight of the bale at the desired weight level. The automatic feedback controller 141 includes a circuit coupled to the digital indicator 140, such as, a conventional microprocessor driven digital computer, which compares the bale weight voltage (i.e. the voltage that reflects the actual weight of the bale) to a voltage that represents the desired weight level ("desired weight voltage"). After the voltages are compared, an error signal is determined and a correction signal is transmitted through controller wire 145 to bale pressure adjuster 160 to effect the necessary change in bale density to reduce the error signal to zero. The automatic feedback controller 141 therefore controls the bale pressure adjuster 160 to either automatically increase or decrease the bale density as needed to maintain the actual weight of the bale at a desired level. The actual weight of the bale is continuously adjusted so long as error signals are detected.

The electronic scale of the present invention significantly improves the accuracy of weighed bales. This system can continuously maintain accuracy to within two pounds of desired weight when moving and to within 1 pound of desired weight when stationary. This is a significant improvement over prior art systems whose accuracy is only about ±20 pounds of desired weight.

The Second Embodiment

Figure 3A:
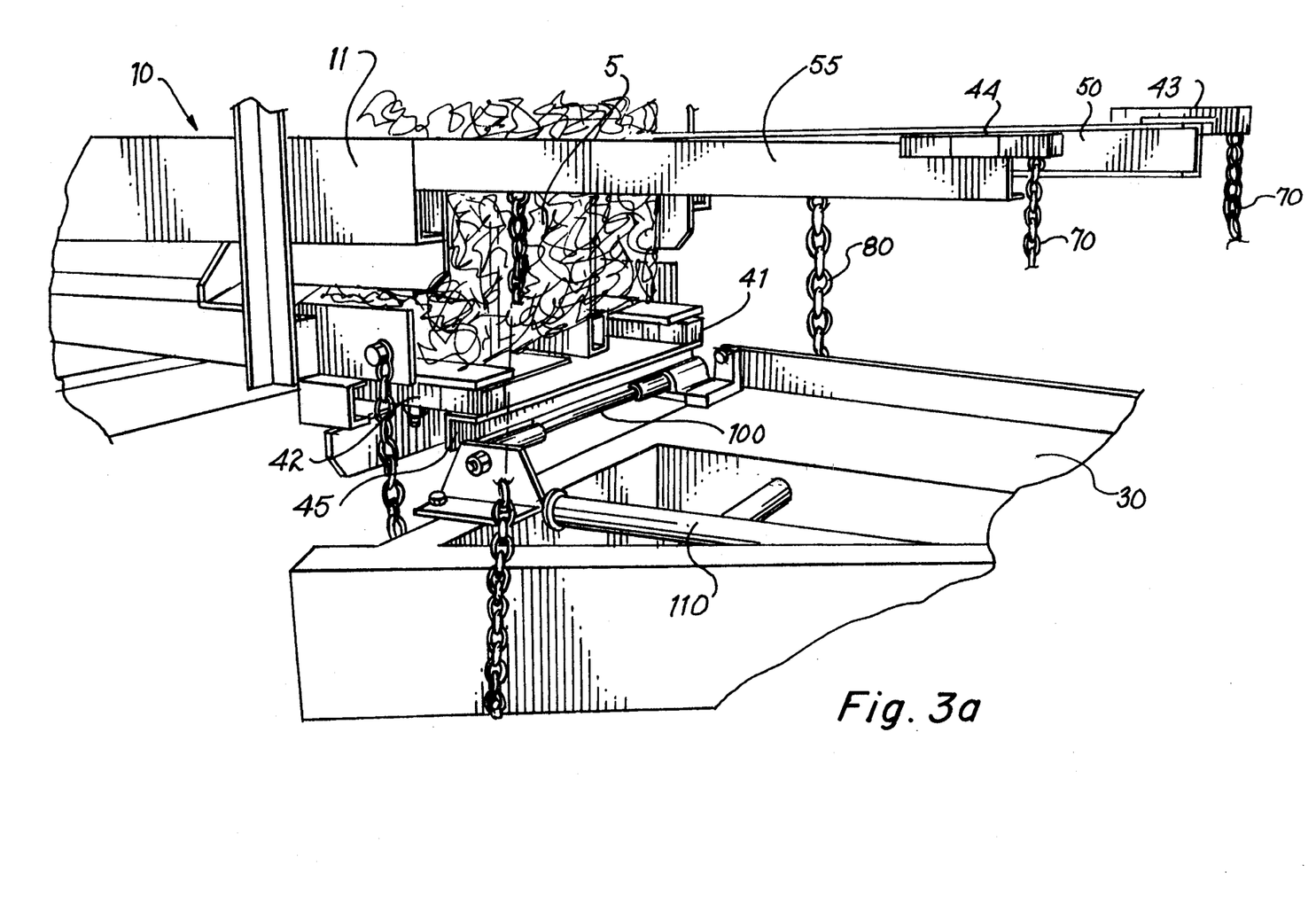
FIG. 3a—Perspective view of the second embodiment of the electronic scale for weighing bales directly attached to a baler.

FIGS. 1a and 3a show the second embodiment of the electronic scale of the present invention for weighing bales. The second embodiment incorporates all of the features of the first embodiment, but there are two main differences.

One difference is that the second embodiment makes use of four load cells instead of just three load cells. As shown in FIG. 3a, the fourth load cell 44 is shown to be mounted to a beam 55, and the beam 55 is mounted to the left side of the bale chute 11. In FIG. 4, when a fourth load cell 44 is used, an additional load cell wire 94 would connect from the output of load cell 44 to the common junction in bell box 90. The use of this fourth load cell 44 allows for the more accurate weighing of the bales on scale 20 since there is one more additional load cell that detects the weight of the bale.

The second difference is that beams 50 and 55 are mounted at the top of the rear end 11 of baler 10 instead of at the bottom. The advantage of placing these two beams at an elevated position is that platform 30 can then pivot to a greater extent in very hilly terrain which reduces the risk of damage to scale components when traversing large berms or of damaging the bale-receiving-structure by avoiding having platform 30 hitting the elevated beams 50 and 55.

Other than these two main differences, the second embodiment encompasses all of the advantages and features of the first embodiment.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a mobile crop baler which produces crop bales at a rear end of the baler as it advances across a field of a crop to be baled and having a system for weighing the bales including a bale-receiving-structure coupled to the baler for receiving the bales discharged from the baler and means for reading out and adjusting a bale-weight-indicative signal wherein the improvement comprises:

a pair of load cells fixedly mounted in spaced relation to each other to the rear end and transversely the longitudinal axis of the baler, a bale-receiving-structure having first and second ends, the first end pivotably connected to the pair of load cells, a first rigid, longitudinal support member extending rearwardly from the rear end of the baler to which is fixedly mounted a third load cell, the second end of the bale-receiving-structure being supported by a tether attached to the third load cell, each load cell having an output for transmitting a bale-weight-indicative output signal, and the outputs of the load cells coupled to the readout means.

2. The improved mobile crop baler of claim 1 further comprising:

a support member secured to each of the transversely mounted load cells, and the bale-receiving-structure pivotably connected to the support members.

3. The improved mobile crop baler of claim 2 wherein the support members comprise an integral transverse member.

4. The improved mobile crop baler of claim 1 wherein the readout and adjust means includes:

each of the load cells having an output at which is produced an output voltage as a bale-weight-indicative signal, a junction coupling each load cell output in parallel to produce a single, output bale-weight-indicative signal for all load cells; and a digital indicator coupled to the junction to receive the output signals over a predetermined time period for determining and displaying the actual weight of the bale by averaging the output voltage signals over the time period.

5. The improved mobile crop baler of claim 1 wherein the longitudinal member is a rearwardly extending beam.

6. The improved mobile crop baler of claim 1 wherein the tether is an adjustable length chain for adjusting the angle of the bale-receiving-structure.

7. The improved mobile crop baler of claim 1 further comprising:

a shock absorber mounted between the longitudinal member and the bale-receiving-structure for reducing vibrations of the digital readouts.

8. The improved mobile crop baler of claim 1 further comprising:
a quick disconnect coupling mounted between each load cell and the junction for conveniently disconnecting the bale-receiving-structure and load cells from the baler.

9. The improved mobile crop baler of claim 1 further comprising:
the bale-receiving-structure having a bale platform and a bale support member mounted to the structure to support the bale on the platform when the bale is being weighed.

10. The improved mobile crop baler of claim 9 further comprising:
a bale turner mounted on the bale platform for kicking the bale to a discharge position after it has been weighed.

11. The improved mobile crop baler of claim 1 wherein the readout and adjust means further comprises:
means for monitoring and manually adjusting a bale pressure adjuster to maintain the actual weight of the bale at a predetermined level.

12. The improved mobile crop baler of claim 1 further comprising:
an automatic feedback controller which monitors and maintains the actual weight of the bale at a predetermined level.

13. The improved mobile crop baler of claim 12 wherein the automatic feedback controller comprises:
a comparator circuit for sensing and outputting the differential signal between the signals representing the actual and predetermined weight of the bale; and
a bale pressure adjuster circuit responsive to the differential signal for automatically increasing or decreasing the bale density as needed so that the actual weight of the bale is maintained at the predetermined level.

14. The improved mobile crop baler of claim 1 further comprising:
a second rearwardly extending rigid, longitudinal support member to which is mounted a fourth load cell, and
means coupling the output of the fourth load cell to the readout means.

15. The improved mobile crop baler of claim 14 wherein
the first and second longitudinal support members extend from a point on the baler structure spaced vertically from the points where the first and second load cells are affixed, and
the second end of the bale-receiving-structure is supported by tethers connected to the third and fourth load cells.

16. The improved mobile crop baler of claim 1 wherein:
the electrical weighing system weighs the bales within a two pound accuracy in a moving baler and within a one pound accuracy in a stationary baler.

17. The method of electronically weighing bales in a field on a mobile crop baler which produces bales at its rear end comprising the steps of:
affixing a first pair of load cells to the rear end of the baler mounted in spaced apart relation transversely relative to the longitudinal axis of the baler;
pivotably coupling one end of a bale-receiving-platform to the pair of load cells;
extending a portion of the baler rearwardly and tethering the other end of the bale-receiving-structure from another third load cell affixed to the extended baler portion;
discharging a bale from the baler onto the bale-receiving-structure;
weighing the bale by detecting deflections of the bale-receiving-structure with the load cells to produce bale-weight-indicative output signals from each cell; and
electrically reading out the outputs of the load cells.

18. The improved mobile crop baler of claim 17 further comprising the step of:
monitoring the actual weight of the bale, and
manually adjusting the bale pressure density to maintain the actual weight of the bale at a predetermined level.

19. The improved mobile crop baler of claim 17 further comprising the step of:
monitoring the actual weight of the bale, and
automatically controlling the bale pressure density to maintain the actual weight of the bale at a predetermined level by zeroing an error signal representing the difference between the actual and predetermined weights.

20. The improved mobile crop baler of claim 17 further comprising the step of:
deflecting the bale-receiving-structure upwardly to prevent damage to the load cells when the bale-receiving-structure contacts a berm in the field.

21. The improved mobile crop baler of claim 20 further comprising the steps of:
averaging the amounts of the deflections detected at the various locations of the bale-receiving-structure to produce a single deflection amount;
sampling a number of single average deflection amounts over a predetermined time period;
averaging the number of single average deflection amounts over the time period to produce a weight voltage;
determining the weight that corresponds to the weight voltage; and
displaying the determined weight of the bale.

22. An electronic scale for weighing bales wherein the scale is adapted to attach to a mobile crop baler which produces crop bales at a rear end of the baler as it advances across a field of a crop to be baled and has a longitudinal support member extending rearwardly from the rear end thereof and wherein the scale comprises:
a pair of load cells adapted to be fixedly mounted in spaced relation to each other to the rear end and transversely the longitudinal axis of the baler,
a bale-receiving-structure, having first and second ends, the first end pivotably connected to the pair of load cells,
a third load cell adapted to be fixedly mounted to the longitudinal support member,
the second end of the bale-receiving-structure adapted to be supported by a tether attached to the third load cell when the scale is attached to the rear end of the baler,
a display means adapted to be mounted on the baler in a manner visible to the operator of the baler, and
the load cells having outputs coupled to the display means for displaying a bale-weight-indicative signal.

23. The electronic scale for weighing bales of claim 22 wherein the bale-receiving-structure further comprises:
   a bale chute bar and bale chute platform defining a bale chute therebetween, a bale support member secured to the structure in the bale chute to support the bale on the platform when the bale is being weighed.

24. The electronic scale for weighing bales of claim 22 wherein the pivotable connection further comprises:
   a support member secured to each of the transversely mounted load cells, and
   the first end of the bale-receiving-structure pivotably connected to the support members.

25. The electronic scale for weighing bales of claim 24 wherein:
   the support members comprise an integral transverse member.

26. The electronic scale for weighing bales of claim 22 further comprising:
   the load cell outputs being coupled to a common junction,
   a quick disconnect coupling mounted between each load cell and the junction for conveniently disconnecting the bale-receiving-structure and load cells from the display means and baler to which the scale is adapted to be attached.

* * * * *